United States Patent Office 3,758,291
Patented Sept. 11, 1973

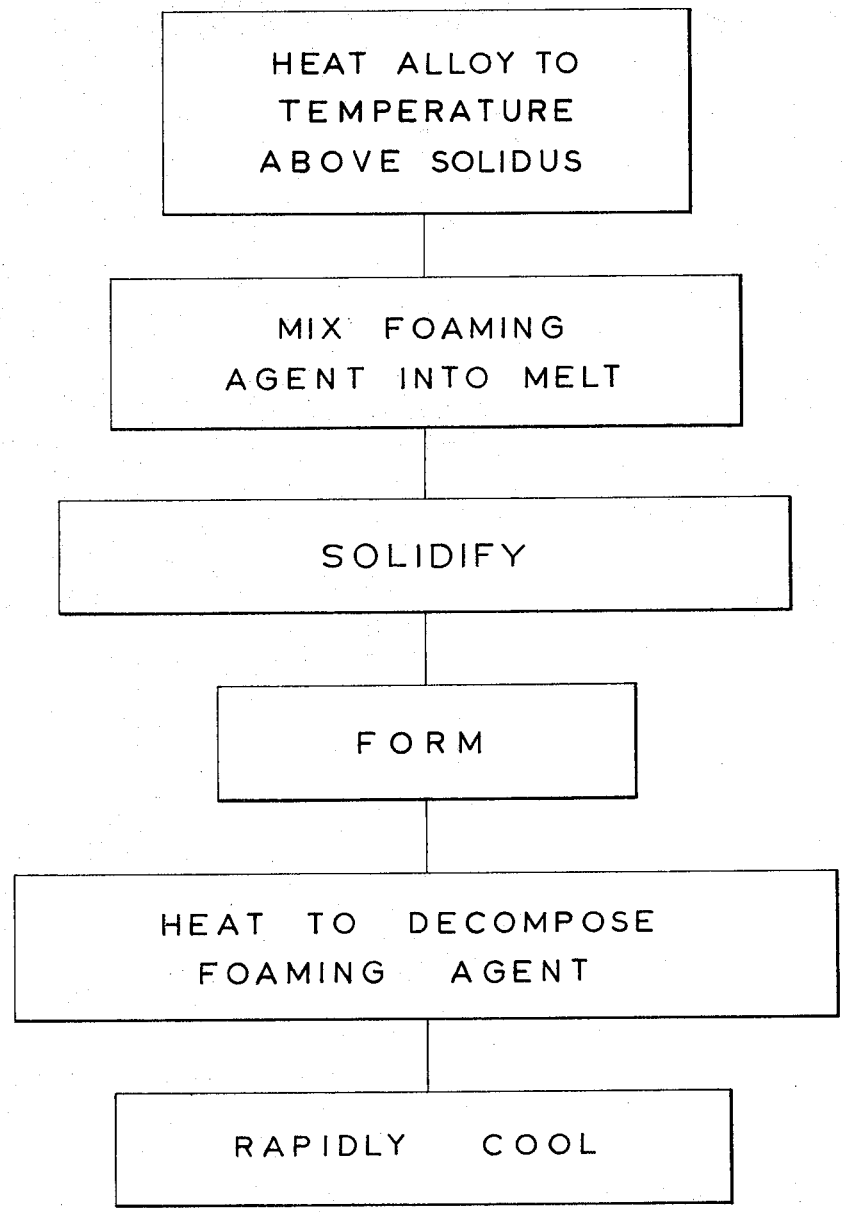

3,758,291
METHOD FOR PRODUCING METAL ALLOY FOAMS
William J. Ptashnik, Bloomfield Hills, Mich., assignor to General Motors Corporation, Detroit, Mich.
Filed Oct. 29, 1971, Ser. No. 193,937
Int. Cl. C22c 1/08
U.S. Cl. 75—20 F        6 Claims

ABSTRACT OF THE DISCLOSURE

A method of producing foamed metal alloy products is disclosed including the steps of heating the alloy to a temperature between its solidus temperature and its liquidus temperature, mixing into the alloy a particulate material which decomposes to release a substantial amount of gas at a temperature above the heating temperature but below the liquidus temperature, and solidifying and working the alloy to an article of desired shape. Thereafter, to effect foaming the article is reheated to a temperature above the decomposition temperature of the foaming agent but below the liquidus temperature to cause the generation of gas in situ and resulting foaming. The foamed article is then rapidly cooled to stabilize the foam.

---

This invention relates to a method for producing a foamed metal alloy product and, more particularly, to a method for producing a foamed product of light metal alloys such as zinc, aluminum and magnesium based alloys.

Foamed or cellularized metal products are useful structural materials. Their combination of relatively low bulk density, high tensile, shear and impact strengths, and low thermal conductivity make them attractive substitutes for more difficult to form and more expensive honeycomb constructions. Further, they are more useful in higher temperature applications than organic foams which are limited to applications below about 400° F.

Heretofore, metal foams have been produced by first melting the metal and then mixing into the molten metal a solid material which decomposes on heating to form a gas. The mixing is carried out either at a temperature lower than the decomposition temperature of the gas forming material, in which case the temperature of the molten metal is raised or the pressure in the system is lowered to cause decomposition of the solid material and resulting foaming of the metal, or the mixing is carried out at a temperature at which decomposition of the solid material takes place. The resulting foamed molten metal is then quickly poured into a mold and rapidly solidified before the foam becomes dissipated.

There are at least five basic disadvantages in producing metal foams by this method: (1) uniform foams, i.e. foams having a uniform distribution of pores, are difficult to produce because of inadequate mixing of the gas forming material in the melt; (2) the heating and cooling rates are difficult to control; (3) the foams are not readily applicable to molding and shaping, particularly complex shaping; (4) thin sections of material required for many applications are difficult to produce; and (5) the molten metal foam quickly becomes dissipated and, in addition, pouring of the foamed molten metal results in considerable drainback of unfoamed metal in the mold and the melting vessel thus lowering of yield of the foaming process.

Accordingly, it is the principal object of this invention to provide a process for making foamed metal alloy products wherein the foaming of the alloy is delayed until after the alloy-gas forming material mixture has been solidified and mechanically worked, shaped or machined into a desired shape whereby the aforementioned disadvantages of the present method are overcome.

It is another object of this invention to provide a process for making foam metal alloy products wherein the alloy is heated to a temperature at which it is in part molten, a foaming agent which decomposes at a higher temperature is mixed into the melt to achieve wetting thereof, and the foaming is accomplished subsequent to solidification and forming of the mixture by a reheating step.

It is a further object of my invention to provide a method for making metal foam products of light metal alloys such as zinc, aluminum and magnesium based alloys wherein foaming is delayed until after shaping of the alloy.

These and other objects of my invention are accomplished by providing an alloy having a equilibrium melting range defined by a solidus temperature and a liquidus temperature. The solidus temperature is the temperature at which an alloy composition begins to melt on heating and finishes freezing on cooling and the liquidus temperature is the temperature at which an alloy composition finishes melting on heating and begins freezing on cooling. The alloy is heated to a temperature in this melting range to render it in part molten and a particulate gas-forming agent, which has a decomposition temperature between the temperature to which the alloy is heated and the liquidus temperature, is mixed into the melt. The mixture is then solidified before any forming takes place and is mechanically worked into a desired shape. The shaped alloy is then reheated to a temperature above the decomposition temperature of the gas-forming agent but below the liquidus temperature for a time sufficient to cause the alloy to become foamed, after which the foamed product is rapidly cooled to stabilize the foam.

Other objects and advantages of the invention will be apparent from the following detailed description, reference being had to the accompanying drawing which is a flow diagram of the improved process for making metal alloy foamed products.

For purposes of the following description of the invention and by way of example, one light metal alloy system which has been successfully foamed in accordance with this invention will be described. However, before proceeding with a detailed description of the invention, it may be helpful to briefly summarize some of the basic principles of equilibrium melting and freezing of alloys.

Binary, ternary and more complex alloy systems characteristically have, at least for a range of compositions, an equilibrium melting range. At temperatures above this melting range a liquid phase exists, below the melting range a solid phase exists, and in the melting range both liquid and solid phases exist in equilibrium. The temperature which separates the liquid phase from the coexisting liquid and solid phases is known as the liquidus temperature and is defined as the temperature at which an alloy composition finishes melting on heating and begins freezing on cooling. The temperature which separates the solid phase from the coexisting liquid and solid phases is known as the solidus temperature and is defined as the temperature at which an alloy composition begins to melt on heating and finishes freezing on cooling. Accordingly, the equilibrium melting (or freezing) range for an alloy composition lies between the solidus temperature and the liquidus temperature and the ratio of liquid to solid in the melting range increases as the liquidus temperature is approached. That is, for example in a two-phase system, on heating the lower melting point phase melts at the solidus temperature. As the temperature continues to increase, the higher melting point phase progressively melts until at the liquidus temperature melting is complete. Accordingly, within this range the alloy is in part molten and in part solid with the alloy having a greater percentage of solid at temperatures toward the solidus temperature and a greater percentage of liquid at temperatures toward the liquidus temperature. Thus, the alloy is generally referred to as being a "slush" due to the physical appearance of the melt and in this state can be readily stirred.

In accordance with this invention, a light metal alloy consisting essentially of, by weight, 78% zinc and 22% aluminum was heated to a temperature of about 855° F. This alloy composition has a solidus temperature of about 780° F. and a liquidus temperature of about 925° F. It may be seen then that the alloy was heated to a temperature within the equilibrium freezing range and thereby rendered in part molten. At this temperature about ½%, by weight, of a particulate foaming agent, specifically titanium hydride, of −325 mesh size was stirred into molten alloy to achieve uniform distribution and wetting of the agent by the alloy. The mixture was then poured and solidified with no significant foaming having occurred. About 1 to 3 minutes was needed to accomplish this step.

The decomposition of titanium hydride, like many foaming agents, is temperature and time dependent. That is, the decomposition of titanium hydride is insignificant below about 662° F. Above this temperature the agent gradually decomposes releasing insubstantial amounts of hydrogen gas. The decomposition begins to become marked at about 842° F. and at higher temperatures substantial amounts of hydrogen gas are released. Zirconium hydride, another well-known foaming agent, acts similarly to titanium hydride, beginning decomposition at about 600° F. It may thus be seen that this invention contemplates the use of foaming agents in combination with alloy systems wherein the foaming agent decomposes to release substantial amounts of gas at a temperature above the temperature to which the alloy is heated, this latter temperature being above the solidus temperature of the alloy composition.

With respect to the amount of foaming agent addition, it has been found that additions up to about 10%, by weight, produce beneficial results with additions in the range of about ½% to 2% being preferred.

After solidification of the mixture, the solidified alloy was then mechanically worked to form sheets of about 0.063 and about 0.070 inch thickness. It is a unique advantage of this invention that the alloy, being unfoamed, can be mechanically worked, shaped or machined by any means available to the art to produce an article of desired shape including complex shapes and thin sections. As discussed above, a basic disadvantage of the prior method of making foamed metal articles lies in the inability to work the foam and, particularly, the inability to achieve complex shapes and thin sections.

Following the forming operation, the alloy sheets were heated to a temperature of about 880° F. for about 15 minutes to decompose the foaming agent mixed therein and thereby generate the foamed articles. As a consequence of foaming the thickness of the 0.070 inch sheet increased to 0.545 inch and the thickness of the 0.063 inch sheet increased to a thickness of 0.520–0.560 inch. It may be seen that the heat treating temperature is above the decomposition temperature of the foaming agent but below the liquidus temperature of the alloy composition, and although the metal is thereby rendered in part molten to allow for foaming; the rapidity of heating and the surface tension of the metal maintains the integrity of the shape during the foaming process. In this regard, the unfoamed and shaped article may be placed in a closed die defining the shape of the foamed product and the die then heated to cause foaming of the article therein as a further aid to maintaining shape integrity.

The foamed product was then rapidly cooled to stabilize the foam.

The degree of foaming obtained in accordance with the foregoing description of the invention may be seen from the following table of experimental results.

| Alloy composition | Sample thickness | | Heat treatment | |
| --- | --- | --- | --- | --- |
| | Before foaming | After foaming | Temperature, ° F. | Time, min., |
| 78% Zn, 22% Al[1] | 0.070 | 0.4 0 | 850 | 15 |
| 78% Zn, 22% Al[1] | 0.070 | 0.545 | 880 | 15 |
| 78% Zn, 22% Al[1] | 0.070 | 0.640 | 900 | 15 |
| 78% Zn, 22% Al[1] | 0.070 | 0.630 | 850 | 15 |
| 78% Zn, 22% Al[1] | 0.070 | 0.715–0.770 | 900 | 15 |
| 78% Zn, 22% Al[1] | 0.070 | 0.470 | 850 | 15 |
| 78% Zn, 22% Al | 0.063 | 0.275–0.300 | 850 | 15 |
| 78% Zn, 22% Al | 0.063 | 0.270–0.290 | 850 | 15 |
| 78% Zn, 22% Al | 0.063 | 0.525–0.555 | 880 | 15 |
| 78% Zn, 22% Al | 0.063 | 0.520–0.560 | 880 | 15 |

[1] 3%, by weight, of 20 micron carbonyl iron powder added to melt as thickening agent.

Although my invention has been described in terms of a specific alloy composition and foaming agent, it will be recognized that other alloys and other light metal alloys including aluminum and magnesium based alloys and other foaming agents might readily be adapted by those skilled in the art and therefore, the scope of the invention will be limited only by the following claims.

I claim:

1. A method of producing a foamed article of a metal alloy having an equilibrium melting range defined by a solidus temperature and a liquidus temperature comprising the steps of heating said alloy to a first temperature in said melting range to render said alloy in part molten, mixing into said molten alloy ½ to 10%, by weight, of a particulate material which releases a substantial amount of gas at a second temperature between said first temperature and said liquidus temperature, solidifying said alloy with said material mixed therein, forming said solidified alloy into a desired shape, heat treating said formed alloy at a third temperature at or above said second temperature but below said liquidus temperature for a time sufficient to cause said material therein to generate gas in situ to cause said formed alloy to become foamed, and then rapidly cooling the foamed product.

2. A method of producing a foamed article of a metal alloy selected from the group consisting of zinc, aluminum and magnesium based alloys having an equilibrium melting range defined by a solidus temperature and a liquidus temperature comprising the steps of heating said alloy to a first temperature in said melting range to render said alloy in part molten, mixing into said molten alloy ½ to 10%, by weight, of a particulate material which releases a substantial amount of gas at a second temperature between said first temperature and said liquidus temperature, solidifying said alloy with said material mixed therein, forming said solidified alloy into a desired shape, heat treating said formed alloy at a third temperature at or above said second temperature but below said liquidus temperature for a time sufficient to cause said material therein to generate gas in situ to cause said formed alloy to become foamed, and then rapidly cooling the foamed product.

3. A method of producing a foamed article of a metal alloy selected from the group consisting of zinc, aluminum and magnesium based alloys having an equilibrium melting range defined by a solidus temperature and a liquidus temperature comprising the steps of heating said alloy to a first temperature in said melting range to render said alloy in part molten, mixing into said molten alloy ½ to 10%, by weight, of a particulate material chosen from the group consisting of titanium hydride and zirconium hydride, which material decomposes at a second temperature between said first temperature and said liquidus temperature releasing a substantial amount of gas, solidifying said alloy with said material mixed therein, forming said solidified alloy into a desired shape, heat treating said formed alloy at a third temperature at or above said second temperature but below said liquidus temperature for a time sufficient to cause said material therein to generate gas in situ to cause said formed alloy to become foamed, and then rapidly cooling the foamed product.

4. A method of producing a foamed article of a metal alloy selected from the group consisting of zinc, aluminum and magnesium based alloys having an equilibrium melting range defined by a solidus temperature and a liquidus temperature comprising the steps of heating said alloy to a first temperature in said melting range to render said alloy in part molten, mixing into said molten alloy ½ to 2%, by weight, of a particulate material chosen from the group consisting of titanium hydride and zirconium hydride, which material decomposes at a second temperature between said first temperature and said liquidus temperature releasing a substantial amount of gas, solidifying said alloy with said material mixed therein, forming said solidified alloy into a desired shape, heat treating said formed alloy at a third temperature at or above said second temperature but below said liquidus temperature for a time sufficient to cause said material therein to generate gas in situ to cause said formed alloy to become foamed, and then rapidly cooling the foamed product.

5. A method of producing a foamed article of a metal alloy consisting essentially of, by weight, 78% zinc and 22% aluminum, said alloy having an equilibrium melting range defined by a solidus temperature and a liquidus temperature comprising the steps of heating said alloy to a first temperature in said melting range to render said alloy in part molten, mixing into said molten alloy ½ to 10%, by weight, of particulate titanium hydride, which decomposes at a second temperature between said first temperature and said liquidus temperature releasing a substantial amount of gas, solidifying said alloy with said titanium hydride mixed therein, forming said solidified alloy into a desired shape, heat treating said formed alloy at a third temperature at or above said second temperature but below said liquidus temperature for a time sufficient to cause said titanium hydride therein to generate gas in situ to cause said formed alloy to become foamed, and then rapidly cooling the foamed product.

6. A method of producing a foamable article of a metal alloy selected from the group consisting of zinc, aluminum and magnesium based alloys having an equilibrium melting range defined by a solidus temperature and a liquidus temperature comprising the steps of heating said alloy to a first temperature in said melting range to render said alloy in part molten, mixing into said alloy ½ to 10%, by weight, of a particulate material chosen from the group consisting of titanium hydride and zirconium hydride, which material decomposes at a second temperature between said first temperature and said liquidus temperature releasing a substantial amount of gas, solidifying said alloy with said material mixed therein, and forming said solidified alloy into a desired shape, said formed alloy being foamable at a third temperature at or above said second temperature but below said liquidus temperature.

References Cited

UNITED STATES PATENTS

| | | | |
|---|---|---|---|
| 3,214,265 | 10/1965 | Fiedler | 75—20 |
| 3,300,296 | 1/1967 | Hardy et al. | 75—20 |
| 3,379,517 | 4/1968 | Graper | 75—20 |
| 3,087,807 | 4/1963 | Allen et al. | 75—20 F |

L. DEWAYNE RUTLEDGE, Primary Examiner

U.S. Cl. X.R.

148—13

PC-1050
(5/69)

UNITED STATES PATENT OFFICE
CERTIFICATE OF CORRECTION

Patent No. 3,758,291  Dated September 11, 1973

Inventor(s) William J. Ptashnik

It is certified that error appears in the above-identified patent and that said Letters Patent are hereby corrected as shown below:

Column 2, line 15, after "having" change "a" to -- an --; line 27, "forming" should read -- foaming --.

Column 4, in the chart under "After foaming" the first number "0.4 0" should read -- 0.440 --.

Signed and sealed this 1st day of January 1974.

(SEAL)
Attest:

EDWARD M. FLETCHER, JR.
Attesting Officer

RENE D. TEGTMEYER
Acting Commissioner of Patents